(12) United States Patent
Miskech et al.

(10) Patent No.: US 6,733,067 B1
(45) Date of Patent: May 11, 2004

(54) VEHICULAR BED ASSEMBLY

(75) Inventors: Peter Miskech, Dearborn, MI (US); David Gary Dahlstrom, Grosse Pointe Farms, MI (US); Keith Alan Kuzmich, Commerce Township, MI (US); Earl Ray Dover, St. Clair Shores, MI (US); Karen Diane Wallag, Dearborn, MI (US); James Matthew Posa, Grosse Ile, MI (US); Joseph Paul Tekelly, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/064,941

(22) Filed: Aug. 30, 2002

(51) Int. Cl.⁷ .................. B62D 33/00; B62D 21/00; B62D 33/077
(52) U.S. Cl. .................. 296/183.1; 296/184.1; 296/193.7; 296/204
(58) Field of Search .................. 296/187.01, 191, 296/193.03, 193.04, 193.07, 203.01, 204, 205, 29, 39.1, 39.2, 181.1, 182.1, 183.1, 184.1; 180/311

(56) References Cited

U.S. PATENT DOCUMENTS

| | | | |
|---|---|---|---|
| 4,188,058 A | | 2/1980 | Resa et al. |
| D271,009 S | * | 10/1983 | Fishler .................. D12/98 |
| 4,984,673 A | | 1/1991 | Saito et al. |
| 5,054,843 A | * | 10/1991 | Gray .................. 296/191 |
| 5,480,180 A | * | 1/1996 | Fuller et al. .................. 296/181 |
| 5,544,932 A | * | 8/1996 | Walworth, Jr. et al. ..... 296/183 |
| 5,549,349 A | * | 8/1996 | Corporon et al. ........... 296/204 |
| 5,575,525 A | | 11/1996 | Walworth et al. |
| 5,664,451 A | | 9/1997 | Schultz |
| 5,730,486 A | | 3/1998 | Jurica |
| 5,769,478 A | * | 6/1998 | Vernese .................. 296/181 |
| 5,938,272 A | | 8/1999 | Jurica et al. |
| 6,128,815 A | | 10/2000 | Jurica et al. |
| 6,142,549 A | | 11/2000 | Clare et al. |
| 6,170,905 B1 | | 1/2001 | Jurica |
| 6,308,411 B1 | | 10/2001 | Wright et al. |
| 6,431,629 B1 | * | 8/2002 | Emery .................. 296/39.2 |
| 2002/0117873 A1 | * | 8/2002 | Lorenzo et al. ............ 296/39.2 |
| 2002/0149223 A1 | * | 10/2002 | Saucier et al. ............. 296/39.2 |
| 2003/0001409 A1 | * | 1/2003 | Semple et al. .............. 296/183 |
| 2003/0218360 A1 | * | 11/2003 | Henderson et al. ......... 296/183 |

FOREIGN PATENT DOCUMENTS

| | | | | |
|---|---|---|---|---|
| EP | 0151550 | * | 8/1985 | .................. 296/29 |
| EP | 315606 | * | 5/1989 | .................. 280/781 |
| EP | 0635418 | * | 1/1995 | .................. 296/204 |
| FR | 2683195 | * | 5/1993 | .................. 296/181 |
| FR | 2811955 | * | 1/2002 | |
| WO | WO 01/66301 A1 | | 9/2001 | |

* cited by examiner

Primary Examiner—D. Glenn Dayoan
Assistant Examiner—H. Gutman
(74) Attorney, Agent, or Firm—Raymond L. Coppiellie (57) ABSTRACT

A vehicle bed assembly including a frontwall, a pair of sidewalls, a backwall, and a bed portion. The walls and the bed portion include stiffening ribs that cooperatively allow the bed assembly to be easily cleaned and allow the bed assembly to be formed from relatively lightweight material. The vehicle bed assembly further includes side mounting assemblies which allow the assembly to be secured to the vehicle frame.

13 Claims, 10 Drawing Sheets

VEHICULAR BED ASSEMBLY

BACKGROUND OF INVENTION

1. Field of the Invention.

The present invention generally relates to a vehicular bed assembly and to a method for securing a vehicular bed assembly onto a vehicular frame and more particularly, to a relatively strong vehicular bed assembly having a side mount assembly which allows the vehicular bed assembly to be easily and selectively installed onto a vehicular frame without the use of an assembly pit.

2. Background of the Invention.

A vehicular bed assembly typically includes a floor pan, a pair of sidewalls which respectively and typically include wheelwell housings, a front panel or wall and a rearwall or panel which is typically formed upon a selectively movable tailgate. Particularly, these members, when operatively and selectively placed upon a vehicle, such as a truck, cooperatively define and provide a storage environment or "space" within which various items may be securely placed.

While the foregoing assembly does provide such a desired storage space, it does have some disadvantages. By way of example and without limitation, the sidewalls, the backwall, and the front panel or frontwall tend to deform as they are respectively contacted by the items contained within the defined storage space as the vehicle is being driven, thereby creating an unaesthetically pleasing overall appearance and oftentimes causing structural damage to the vehicle. One approach to overcoming this drawback includes the use of relatively thick material to form the sidewalls, the backwall and the front panel. While this approach does reduce the likelihood of structural damage (i.e., the thick material is relatively strong), such material is relatively expensive, thereby increasing the overall cost of producing the vehicle. Moreover, such material is relatively heavy, thereby undesirably increasing the amount of fuel required to operate the vehicle and requiring much effort and strength to open and close the tailgate.

Further, an "assembly pit" is typically required to attach the floor pan (or the pre-assembled vehicle bed) to the vehicular frame during vehicular assembly. Particularly, assemblers are placed within a hole or depressed area, the vehicular frame (or the pre-assembled bed) is transported over the pit or hole, the floor pan (or the pre-assembled bed) is then operatively placed on top of the properly positioned frame, and the assemblers then place securing members or assemblies over their heads and through the frame and the previously and operatively positioned floor pan. While this arrangement does allow a floor pan (or the pre-assembled bed) to be selectively secured to the vehicular frame, the required assembly operation is physically uncomfortable and tiring to the assemblers, requires an interruption of the overall assembly process when the assemblers leave the "pit", and is relatively time consuming, especially as the assemblers become fatigued or tired.

There is therefore a need for a new and improved vehicle bed assembly and a method for selectively securing a bed assembly onto a vehicular frame in a manner which overcomes at least some of the previously delineated drawbacks of prior techniques and strategies. The present invention overcomes these drawbacks in a new and novel fashion.

SUMMARY OF INVENTION

It is a first non-limiting advantage of the present invention to provide a vehicle bed assembly which overcomes some or all of the previously delineated drawbacks of prior vehicular bed assemblies.

It is a second non-limiting advantage of the present invention to provide a method for securing a vehicle bed assembly onto a vehicular frame in a manner which overcomes some or all of the previously delineated disadvantages of prior methods of assembling or selectively securing a vehicular bed assembly onto a vehicular frame.

According to a third non-limiting advantage of the present invention, a vehicle bed assembly is provided. Particularly, the vehicle bed assembly includes a floor pan; and a side mount assembly which is coupled to the floor pan and which allows the floor pan to be selectively coupled to a frame of a vehicle.

According to a fourth non-limiting advantage of the present invention, a vehicle floor bed assembly for use in combination with a vehicle having a frame is provided. Particularly, the vehicle floor bed assembly includes a floor pan having longitudinally extending raised stiffening ribs which cooperatively form at least one first channel; a frontwall which is coupled to the floor pan and which has raised stiffening ribs which extend above and below the floor pan, the raised stiffening ribs cooperatively forming at least one second channel which is communicatively aligned with the at least one first channel; a pair of sidewalls which are coupled to the floorpan; and a backwall which is coupled to the floorpan.

According to a fifth non-limiting advantage of the present invention, a method for securing a bed onto a vehicular frame is provided. Particularly, the method includes the steps of placing the bed onto the frame; providing a fastener assembly; and coupling the fastener assembly to the bed as the fastener assembly is moved parallel to the bed and the frame.

These and other features and advantages of the present invention will become apparent from a reading of the following detailed description of the preferred embodiment of the invention and by reference to the following drawings.

DETAILED DESCRIPTION

Figure 1:
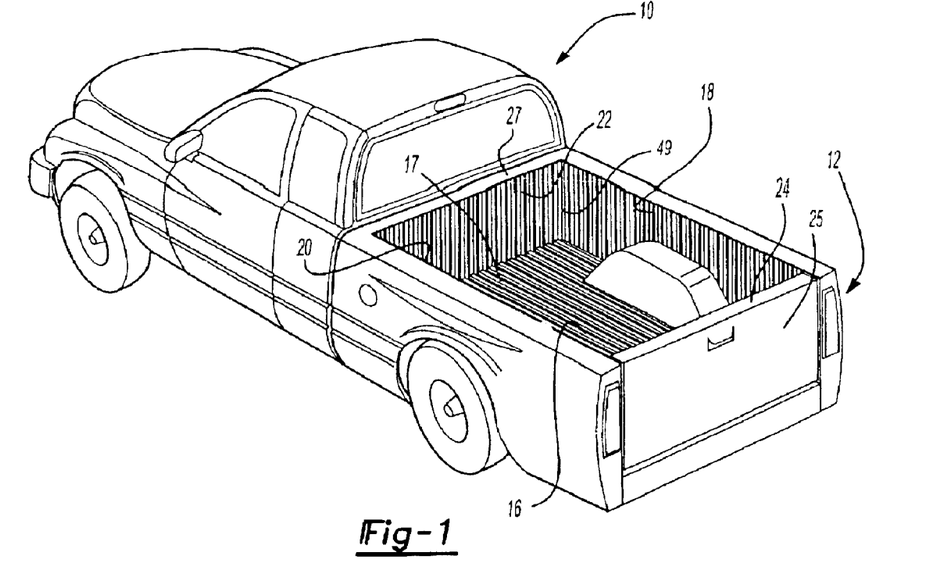
FIG. 1 is a perspective view of a vehicle which includes a vehicular bed assembly which is made in accordance with the teachings of the preferred embodiment of the invention.

Referring now to FIG. 1, there is shown a vehicle 10 having a bed assembly 12 which is made in accordance with the teachings of the preferred embodiment of the invention.

Figure 2:
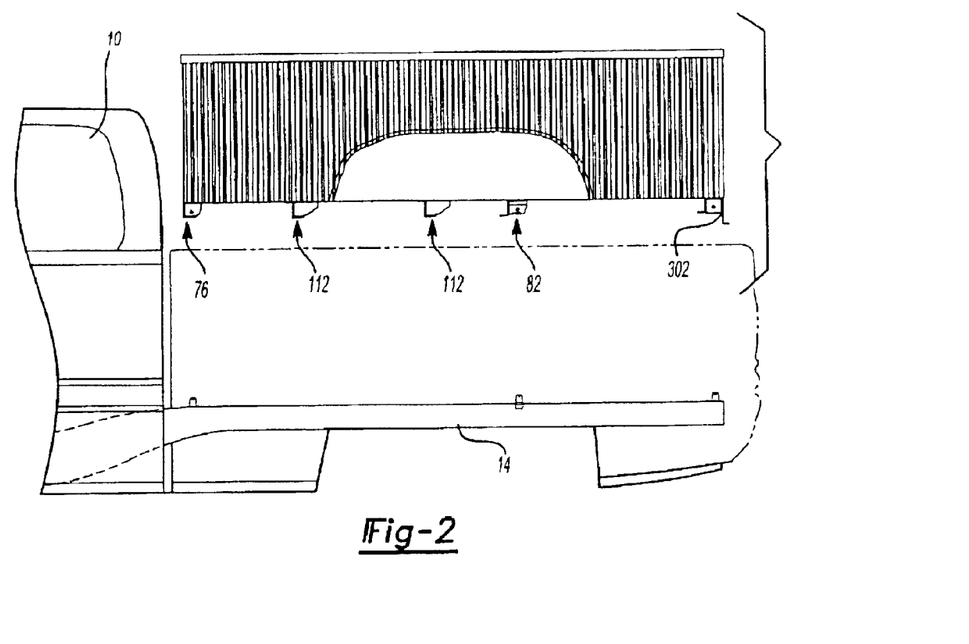
FIG. 2 is a partial unassembled side sectional view of the vehicle which is shown in FIG. 1.
Figure 3:
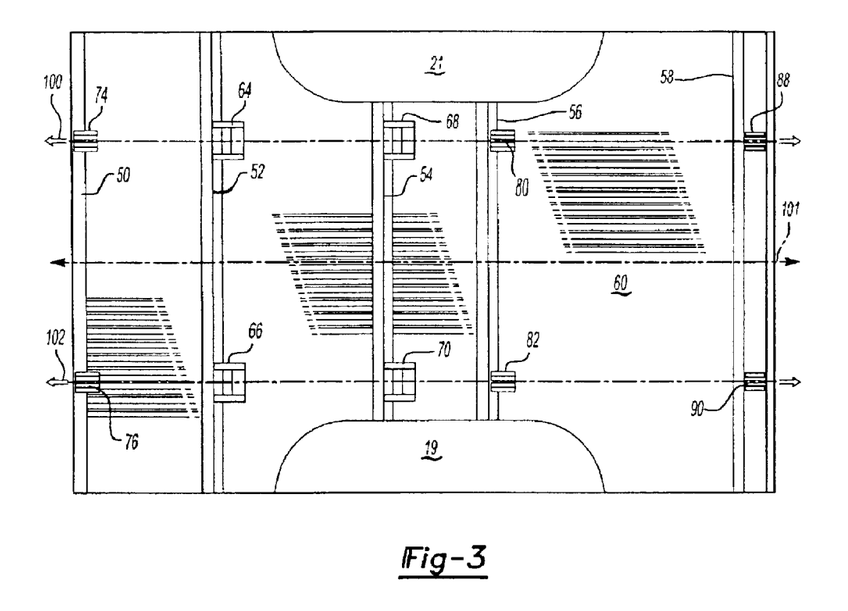
FIG. 3 is a bottom view of the bed assembly which is shown in FIGS. 1 and 2.

Particularly, as best shown in FIGS. 1–3, the vehicular bed assembly 12 is adapted to be selectively secured to the vehicular frame 14 of the vehicle 10 and to provide storage or containment space. It should be noted at the outset that the vehicular bed assembly 12 is not limited for use with a particular type of vehicular frame 14 or with a particular type of vehicle 12, but may be used with a wide variety of such frames and vehicles. Hence, vehicle 12 and frame 14 are utilized within this description for illustration purposes only and nothing in this description is meant to limit the present invention to a particular type of vehicular frame assembly or vehicle.

The vehicular bed 12 includes a floor pan portion or member 16, a pair of substantially identical sidewalls 18, 20, a head or top/front portion or frontwall 22, and a back or rearwall 24 which forms part of a tailgate 25 which is selectively movable from a first closed position (shown best in FIG. 1) to a second open position in which the rearwall 24 is substantially coplanar to the floor pan 16. The vehicular bed assembly 12 further include substantially identical wheelwells 19, 21 which are respectively and physically coupled (e.g., by the use of a welded or an adhesive type connection) to the sidewalls 18, 20. Each wheelwell 19, 21 is also physically coupled (e.g., by the use of a welded or an adhesive type connection) to the floor pan 16. The walls 18, 20, 22, 24, floor pan 16, and wheelwells 19, 21 therefore cooperatively form a storage containment cavity or containment space 17 into which various items or material may be selectively placed.

In the most preferred embodiment of the invention, each of the substantially identical sidewalls 18, 20, the head or frontwall 22, the floor pan 16, and the back or rearwall 24 includes substantially identical raised stiffening ribs or beads 32 (e.g., the beads 32 are longitudinally disposed upon or formed within the floor pan 16). Particularly, each of the raised stiffening ribs or beads 32 has a substantially rectangular or substantially C-shaped cross sectional area, although beads of a different cross sectional area may be utilized (e.g., one or more of the walls 18, 20, 22, 24 may have raised beads of a dissimilar cross sectional area). In this manner, a substantially rectangular channel 36 is formed between each adjacent pair of stiffening beads 32. Further, in the most preferred embodiment of the invention, channels 36 are equidistantly spaced on the frontwall 22, channels 36 are equidistantly spaced on each of the sidewalls 18 and 20, channels 36 are equidistantly spaced on the backwall 24, and channels 36 are equidistantly spaced upon the floor pan 16 and are longitudinally coextensive to the floor pan 16.

In the preferred embodiment of the invention, each of the channels 36 which are formed on the frontwall 22 are respectively and communicatively aligned with a unique one of the channels 36 which are formed on the floor pan 16 (i.e., each of the ribs or beads 32 which are formed on the frontwall 22 are respectively aligned with a unique one of the ribs or beads 32 which are formed on the floor pan 16). Similarly, each of the channels 36 which are formed on the rearwall 24 are respectively and communicatively aligned with a unique one of the channels 36 which are formed on the floor pan 16 (i.e., each of the ribs or beads 32 which are formed on the rearwall 24 are respectively aligned with a unique one of the ribs or beads which are formed on the floor pan 16). Further, each of the channels 36 which are formed on the sidewall 18 are respectively and communicatively coupled to the one single channel 36 which is formed on the floor pan 16 and which resides in closest proximity to the sidewall 18. Similarly, each of the channels 36 which are formed on the sidewall 20 are respectively and communicatively coupled to the one single channel 36 which is formed on the floor pan 16 and which resides in closest proximity to the sidewall 20. In this manner, moisture and debris may be communicated to the channels 36 which are formed on the floor pan 16 and then communicated to the channels 36 which are formed on the end portion or wall 24. That is, once the tailgate 25 is opened, (i.e., moved to a position in which backwall 24 is substantially coplanar with the floor pan 16), the communicating channels 36 cooperatively allow the moisture and debris to be removed from the containment portion 17 of the vehicle bed 12 and exited from the containment portion 17 to an area outside of the vehicle 10 through the channels 36 which are disposed upon the backwall 24, such as by the use of the hose or the application of another pressurized water source. The foregoing communicating channel relationship thereby assists in maintaining the cleanliness of the containment cavity 17 and the overall appearance of the vehicle 10. Further, the stiffening ribs 32, which form the channels 36, make the entire containment cavity 17 structurally strong and resistant to damage and deformation. Hence, the foregoing rib arrangement (e.g., requiring stiffening ribs 32 on each of the walls 18, 20, 22, 24 and the floor pan 16 which cooperatively form the containment cavity 17) structurally strengthens the vehicle 10 (i.e., the bed 12), thereby allowing for the use of a light material with which to form the walls 18, 20, 22 and 24 and floor member 16. Further, the rib arrangement allows the vehicular bed 12 to be readily cleaned and provides a pleasing overall aesthetic appearance.

Further, in one non-limiting embodiment, the stiffening ribs or beads 32, which are formed on the frontwall 22, extend above the floor pan or the bed 16 (i.e., in a direction away from the vehicular frame 14) and below the floor pan or bed 16, (i.e., in a direction toward the vehicular frame 14), thereby further increasing the stiffness of the frontwall 22 and of the entire formed containment cavity 17 and further reducing the probability that the frontwall 22 will be deformed by material and items which may be selectively placed within the containment cavity 17. In an alternate embodiment of the invention, as shown best in FIG. 5, the portion 23 of the frontwall 22 which extends below the floor pan 16 is made substantially flat in order to allow the portion 23 to be securely coupled to the cab backwall 27, and forms a flange member 50 which traverses the width of the floor pan 16 and which cooperates with the underside surface 60 of the floor pan 16 to form a bracket retention trench. Moreover, the ribs 32 which are formed on the sidewalls 18, 20 also abut the floor pan 16, further increasing the stiffness of the joint formed between the sidewall 20 and the floor pan 16 and the sidewall 18 and the floor pan 16. In one non-limiting embodiment of the invention, sidewalls 18, 20 are coupled to the frontwall 22 by welded connections, such as welded joint or connection 49 or by another securing methodology and sidewall 18, 20 may be similarly coupled to the backwall 24 (i.e., in an embodiment without a selectively movable tailgate 25).

Moreover, the vehicle bed assembly 12 further includes (in addition to transverse member 50) other cross rail members 52, 54, 56, and 58 (other types, arrangements, or number of cross rail members may be utilized in other non-limiting embodiments) which are attached to the underside or frame attachment surface 60 of the floor pan member 16. Moreover, as shown, each of these members 50, 52, 54, 56 and 58 traverse substantially the entire width of the surface 60 as they respectively extend from sidewall 18 to sidewall 20, and, in this manner, structurally strengthen the floor pan 16 while allowing the floor pan 16 to be selectively and easily secured to the vehicular frame 14 in a manner which is more completely delineated below in cooperation with the securing or fastening members or assemblies 64, 66, 68, 70, 74, 76, 80, 82, 88, and 90.

As is shown, the vehicular bed assembly 12 includes substantially identical gusset members 64, 66, 68, and 70. Particularly, members 64, 66 are equidistantly spaced from the axis of symmetry 101 of the floor pan 16, and operatively and respectively disposed upon opposite sides of the axis of symmetry 101, and are mounted to member 52. The members 68, 70 are also equidistantly spaced from the axis 101, are respectively and operatively disposed an opposite sides of the axis 101, and are mounted to member 54. The vehicle bed assembly 12 also includes a pair of substantially identical mounting members 74, 76 which are equidistantly spaced from the axis 101, are operatively and respectively disposed upon opposite sides of the axis 101, and are mounted upon the transverse member 50. Further, the vehicle bed assembly 12 includes a pair of substantially identical mounting members 80, 82 which are equidistantly spaced from the axis 101, are operatively and respectively disposed upon opposite sides of the axis 101, and are mounted upon the transverse member 56. Further, as shown, the vehicle bed assembly 12 also includes two substantially identical mounting members 88, 90 which are equidistantly spaced from the axis 101, are operatively disposed upon opposite sides of the axis 101, and which are mounted upon the transverse member 58. In one non-limiting embodiment of the invention, members 74, 64, 68, 80, and 88 are operatively disposed along a first axis 100 while members 76, 66, 70, 82, and 90 are operatively and respectively disposed along a second axis 102, although other mounting arrangements may be used.

In one non-limiting embodiment of the invention, the walls 18, 20, and 22 are attached to the floor pan 16 (e.g., by the use of welded connections) and the members 52, 54, 56, and 58 are attached to the underside surface 60 of the floor pan 16 (e.g., also by the use of welded connections). The wall containing tailgate 25 is movably attached to the vehicle 10, as shown. Particularly, the members 50, 52, 54, 56, and 58 cooperate with the members 64, 66, 68, 70, 74, 76, 80, 82, 88, and 90 to selectively attach the floor panel 16 to the frame 14, thereby obviating the use of an assembly pit while structurally strengthening the entire vehicular bed assembly, in a manner which is more fully delineated below.

Figure 4:
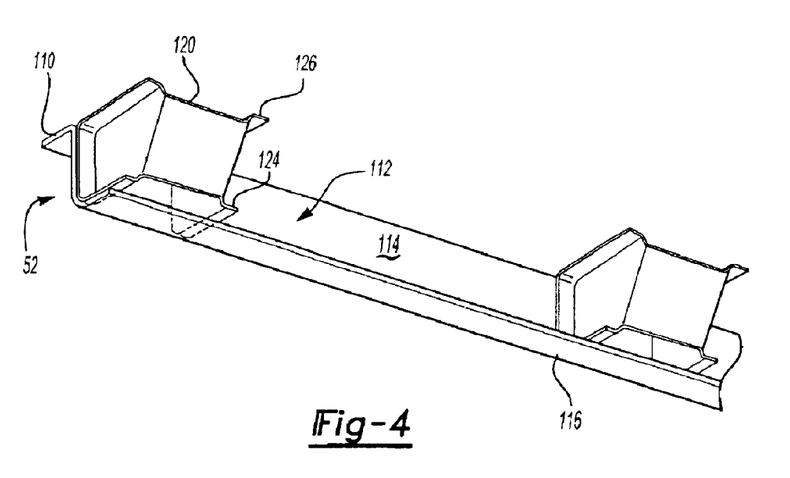
FIG. 4 is a perspective view of a member of the bed assembly which is shown in FIG. 3.

As best shown in FIG. 4, the transverse member 52, is generally "L-shaped" having a first flat flange portion 110 which is selectively attached to the underside floor pan surface 60 and a trench or gusset support portion 112 which is formed by walls 114, 11 6. Particularly, wall 114 orthogonally protrudes from wall 110 and wall 116 orthogonally protrudes from wall 114.

As shown, each of the gussets 64–66 (as well as gussets 68, 70) include a generally hollow body 120 which is formed in the general shape of a box, having a generally rectangular cross sectional area, and further including two substantially identical lower "feet" or flange attachment portions 124 and two substantially identical upper "feet" or flanged attachment portions 126. Particularly, two of the respective lower attachment portions 124, of the gusset 66, attach the gusset 66 (e.g., by the use of a welded connection) to the portion 116 of member 52 and two of the respective attachment portions 124, of the gusset 64, attach the gusset 64 to the portion 116 of the member 52. Further, the two attachment portions 124 of gusset 68 attach the gusset 68 to the portion 116 of the member 54 (which is substantially identical to member 52) and two of the attachment portions 124 of the gusset 70 attach the gusset 70 to the portion 116 of the member 54. The respective pair of "feet" or attachment portions 126 of each of the gussets 64, 66, 68, and 70 respectively attach these gussets 64, 66, 68, and 70 (e.g., by the use of welded connections) to the undersurface 60 of the floor pan 12, and, in one non-limiting embodiment of the invention, the gussets 64, 66 are initially attached to the member 52 and gussets 68, 70 are initially attached to the member 54. The respective attachment portions 126 of each of the gussets 64, 66, 68, 70 are then coupled to surface 60 and the completed floor pan assembly (including the floor pan 16 which is attached to walls 18, 20, and 22 and the attached members 52, 54, 56, 58) may then be dropped onto the vehicular frame 14 in a manner which is more fully delineated below and secured to the vehicular frame 14 in a manner which is also fully delineated below.

Figure 5:
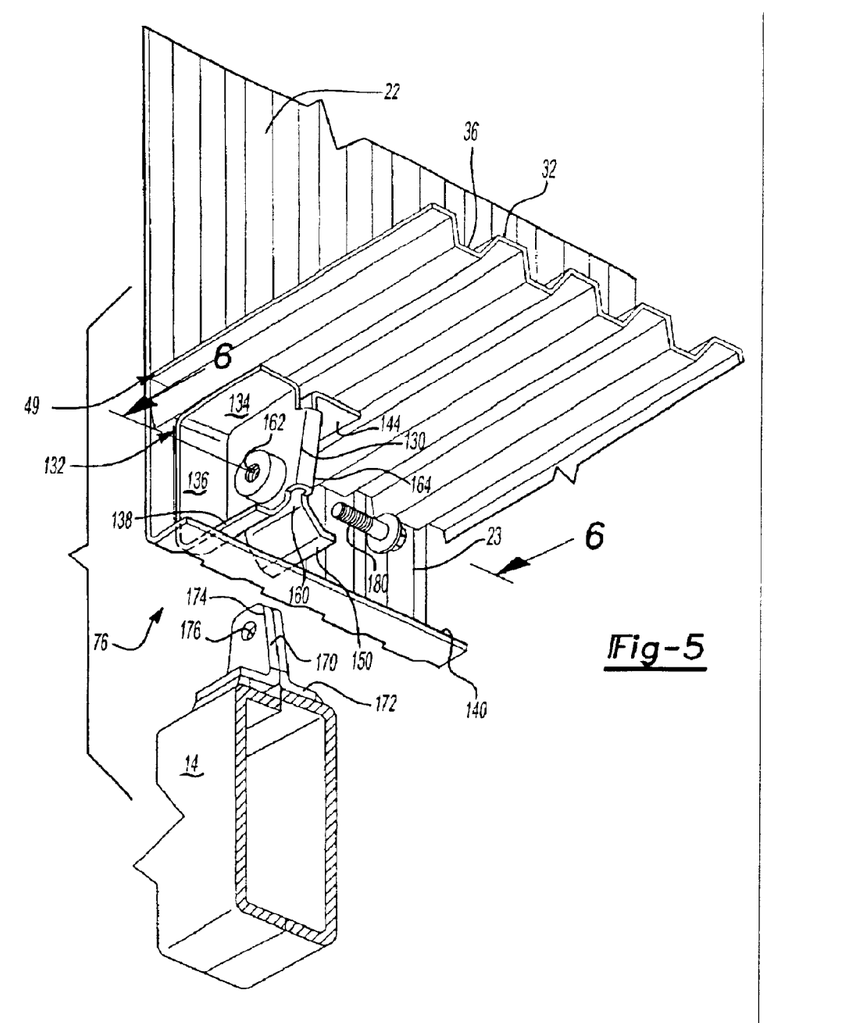
FIG. 5 is an unassembled perspective view of a mounting bracket assembly which forms a part of the bed assembly which is shown in FIG. 1–3 in combination with a portion of the frame of the vehicle and a portion of the bed assembly which is also shown in FIGS. 1–3.
Figure 6:
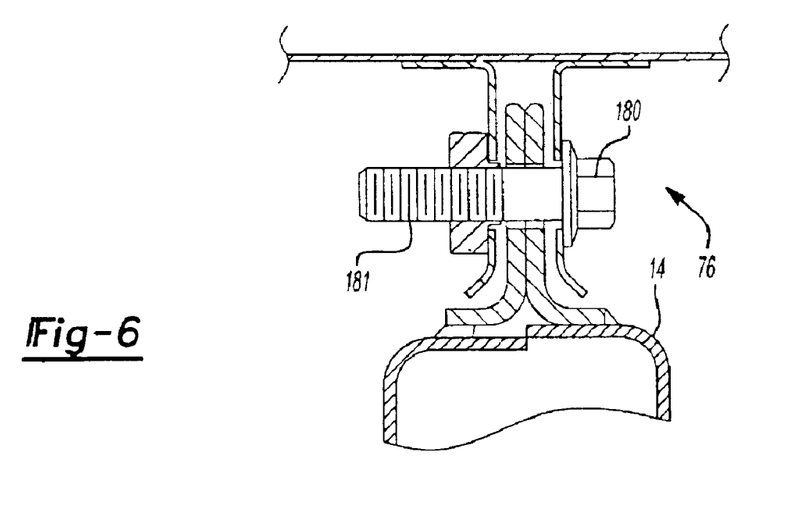
FIG. 6 is an assembled side sectional view of the mounting bracket assembly which is shown in FIG. 5 and which is taken along view line 6—6.

Referring now to FIGS. 5 and 6, there is shown a mounting assembly 76 which is made in accordance with the teachings of the preferred embodiment of the invention. As earlier delineated, each of the assemblies 74, 76 are substantially similar and hence the following description of the assembly 76 is equally applicable and descriptive with respect to the mounting assembly 74.

As shown, mounting assembly 76 includes a bracket 130 which is operatively deployed within the bracket retention trench formed by the flange 50 and the underside surface 60 of the floor pan 16. Particularly, the bracket 130 includes a generally "C" shaped attachment portion 132 including a first substantially flat portion 134 which is selectively coupled (e.g., by the use of a welded connection) to the underside surface 60 of the floor pan 16, a second substantially flat portion 136 which is selectively coupled (e.g., by the use of a welded connection) to the portion 23 of the b front wall 22 which extends below the floor pan 16, and a third substantially flat portion 138 which is selectively coupled (e.g., by the use of a welded connection) to the surface 140 of the lower flange member 50 of the back front wall 22. The bracket 130 further includes a fourth substantially flat portion 144 which is selectively coupled (e.g., by the use of a welded connection) to the underside surface 60 of the floor pan 16 and a fifth protruding or flared portion 150 which is selectively coupled (e.g., by the use of a welded connection) to the surface 140 of the flange member 50. The bracket 130 further includes a substantially hollow interior cavity 160 and a pair of substantially identical threaded apertures 162, 164 which are aligned on axis which traverses the hollow interior cavity 160 and which each have a certain predetermined and substantially similar diameter.

Further, the mounting assembly 76 includes a flange member 170 having a substantially flat portion 172 which is selectively attached (e.g., by the use of a welded connection) to the vehicular frame 14 and a protruding portion 174 having an aperture 176 which has a diameter which is substantially similar to the diameter of the threaded apertures 162,164.

During assembly, the protruding portion 170 is selectively inserted into the generally hollow cavity 160, effective to cause the apertures 162, 164, and 176 to be aligned. As shown, the assembly 76 includes a fastening member 180 which may, in one non-limiting embodiment, comprise a screw having threads 181 which are complementary to the threads which exist within the aperture 162, 164 and which is rotatably inserted through the aligned apertures 162, 164, and 176 and which is effective to cause the flange 170 be held in the generally hollow interior cavity 160, thereby coupling the floor pan 16 to the vehicular frame 14. Importantly, the fastener 180 may be inserted from the side of the floor pan 16 (parallel to the frame 14 and the bed 16) after the floor pan 16 is dropped" onto the vehicular frame 14, thereby obviating the need for an assembly pit.

Figure 7:
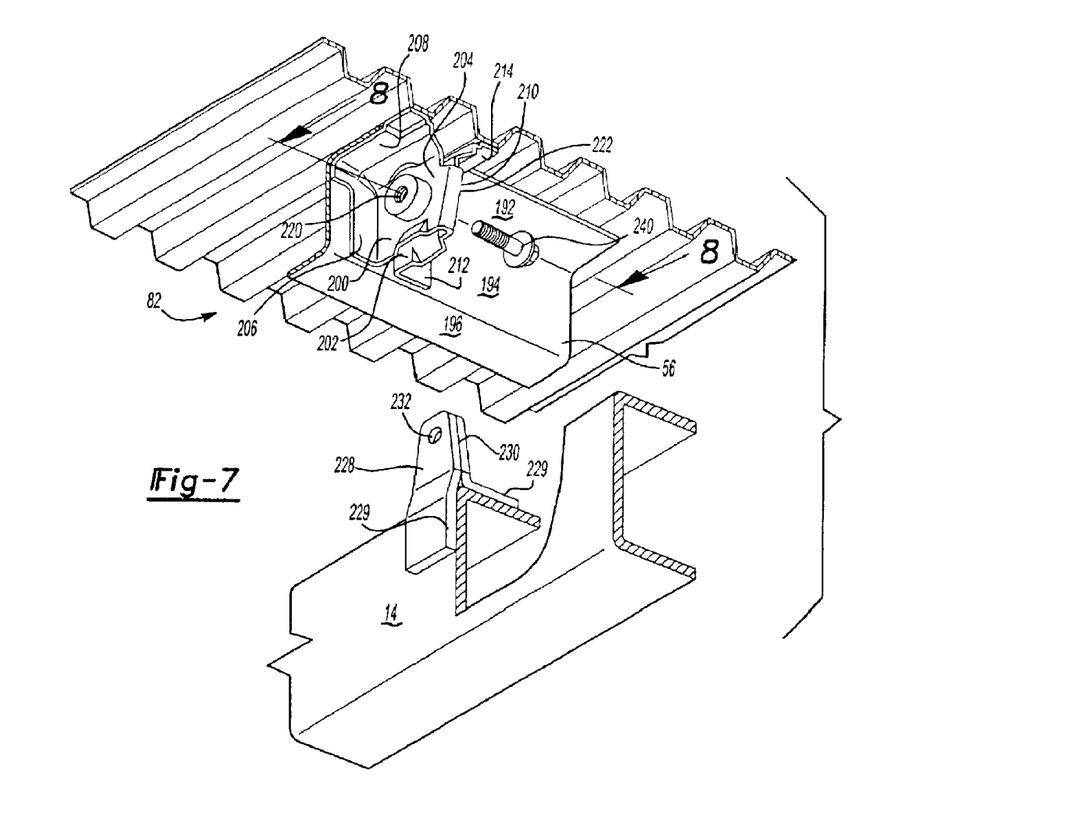
FIG. 7 is an unassembled perspective view of a second mounting bracket assembly which forms a part of the bed assembly which is shown in FIGS. 1–3 in combination with a portion of the frame of the vehicle and a portion of the bed assembly which is also shown in FIGS. 1–3.
Figure 8:
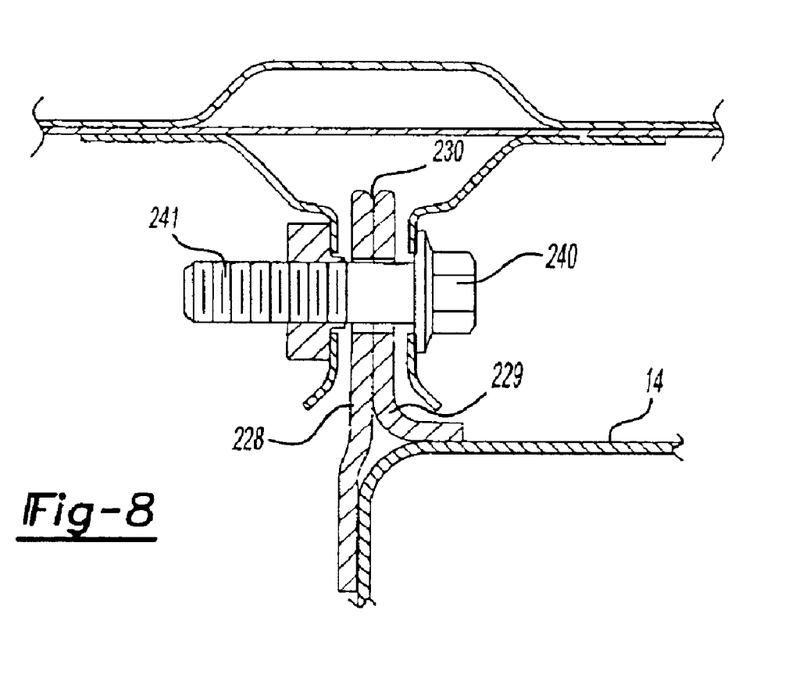
FIG. 8 is an assembled side sectional view of the bracket assembly which is shown in FIG. 7 and which is taken along view line 8—8.

Referring now to FIGS. 7 and 8, there is shown a mounting assembly 82 which is made in accordance with the teachings of the preferred embodiment of the invention. As was earlier delineated, the mounting assembly 82 is substantially similar to the mounting assembly 80 and hence the following description, which is associated with mounting assembly 82, is equally applicable to the mounting assembly 80.

As shown, the member 56 comprises a substantially "L shaped" member having a first substantially flat lip portion 192 which is selectively coupled (e.g., by the use of a welded connection) to the underside surface 60 of the floor pan 16. The member 56 further includes a wall portion 194 which orthogonally projects from the flat lip portion 192 and a third substantially flat portion 196 which orthogonally projects from the portion 194, which is substantially parallel to the portion 192, and which rests upon the vehicular frame 14 when the floor pan 16 is attached to the vehicular frame 14.

The mounting assembly 82 includes a bracket 200 having a generally hollow interior cavity 202 and a first side portion 204 having a first generally flat portion 206 which is attached to (e.g., by the use of a welded connection) to the portion 194 of the member 56 and a second generally flat portion 208 which is attached to (e.g., by the use of a welded connection) to the portion 192 of the member 56 and to the underside surface 60 of the floor pan 16. The bracket 200 further includes a second side portion 210 which has a first flat portion 212 which is attached (e.g. by the use of a welded connection) to the portion 194 of the member 56 and a second flat portion 214 which is attached (e.g., by the use of a welded connection) to the underside surface 60 of the floor pan 16. The bracket 200 further includes threaded apertures 220, 222 which are aligned along an axis which traverses the hollow interior cavity 202. The mounting assembly 82 also includes a flange member 228 which has first portions 229 which are attached (e.g., by the use of respective welded connections) to the vehicular frame 14 and a second protruding portion 230 which includes an aperture 232 and which orthogonal protrudes from the portions 229 and from the vehicular frame 14. The aperture 232 is substantially similar to apertures 220, 222.

In operation, the protruding portion 230 is inserted into the generally hollow interior cavity 202, effective to cause the apertures 232, 220, 222 to be aligned along an axis which traverses the generally hollow interior cavity 202. The assembly 82 further includes a fastener member 240 which, in one non-limiting embodiment of the invention, comprises a screw having threads 241 which are complementary to the threads of the apertures 220, 222. The member 240 is threadingly inserted through the aligned apertures 220, 222, 232, effective to operatively position the flange 228 within the generally hollow interior cavity 202, thereby attaching the member 56 and the floor pan 16 to the vehicular frame 14.

Figure 9:
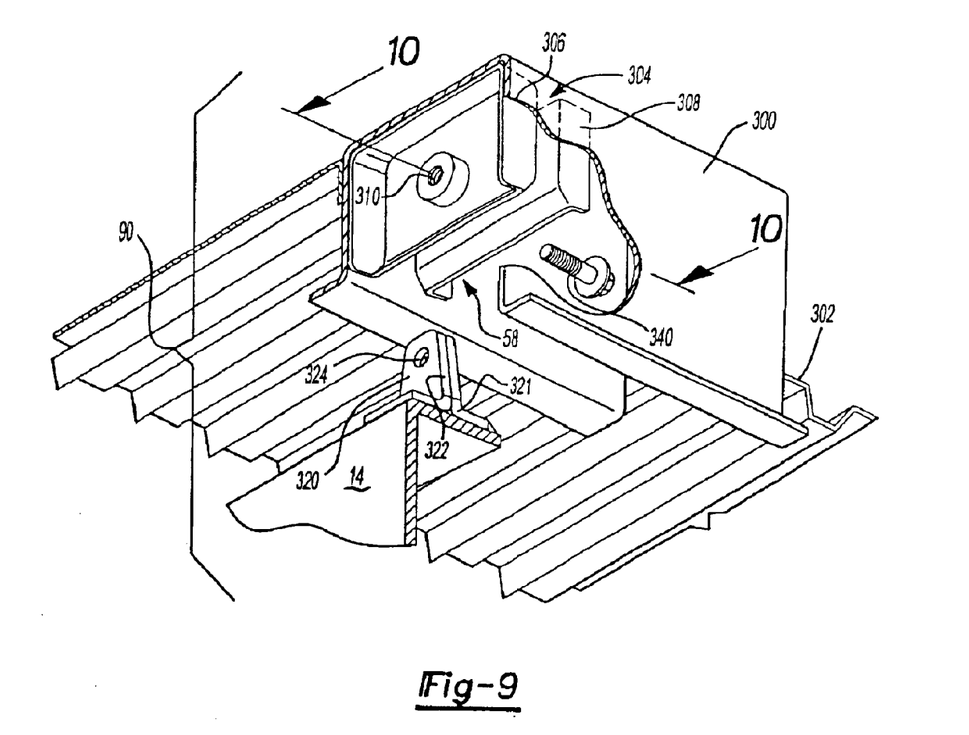
FIG. 9 is an unassembled perspective view of a third mounting bracket assembly which forms a part of the bed assembly which is shown in FIGS. 1–3 in combination with a portion of the frame of the vehicle and a portion of the bed assembly which is also shown in FIGS. 1–3.
Figure 10:
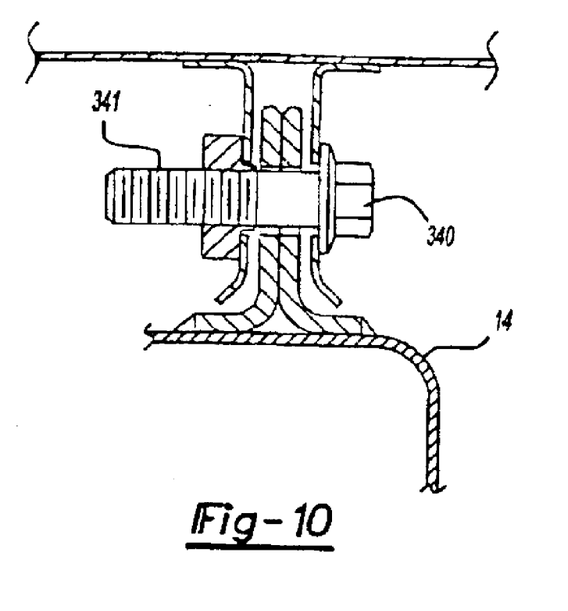
FIG. 10 is an assembled side sectional view of the bracket assembly which is shown in FIG. 9 and which is taken along view line 10—10.

Referring now to FIGS. 9 and 10, there is shown a mounting assembly 90 which is generally shown in FIG. 3. It should be appreciated that the following description of the mounting assembly 90 is substantially similar to the description of mounting assembly 88 and that each of these assemblies 88, 90 are adapted to be selectively coupled to the member 58.

Particularly, the member 58 comprises a substantially "U shaped" member 300 which is linearly coextensive to and which is attached (e.g., by the use of a welded connection) to the outer edge 302 of the floor pan assembly 16 (e.g., the edge of the floor pan assembly 16 which is proximate to the tail gate 25). The mounting assembly 90 includes a bracket assembly 304 having generally rectangular and substantially similarly shaped members 306, 308. Each of the substantially similar shaped members 306, 308 includes a substantially identical threaded aperture 310 and when the substantially similar shaped members 306, 308 are operatively coupled to the member 52 (i.e., operatively disposed within the member 52) the respective apertures 310 are aligned. The mounting assembly 90 further includes a flange member 320 having a first flat portion 321 which is coupled (e.g., by the use of a welded connection) to the vehicular frame 14 and a second protruding portion 322 having an aperture 324 which is substantially similar is size and in shape to each of the substantially identical apertures 310. Particularly, the portion 322 is inserted between the two substantially identical members 306, 308, effective to cause the apertures 310 and the aperture 324 to be aligned. The mounting assembly 90 further includes a fastener member 340 having a portion 341 having threads which are complementary to the threads of the aperture 310. Particularly, the portion 341 is selectively and threadably inserted through the aligned apertures 310 (and through aperture 324), effective to secure the protruding portion 322 between the two substantially identical members 306, 308 and to couple the vehicle frame 14 to the member 58.

In operation, the walls 18, 20, 22, and the wall 24 (i.e., the tailgate assembly 25), the floor pan 16, and the wheelwells 19, 21 are coupled in the previously delineated manner after the members 52, 54, 56, and 58 are attached to the surface 60 of the floor pan 16, thereby cooperatively forming a floor pan assembly. The floor pan assembly is then attached to the vehicular frame 14 by the use of the fasteners 180, 240, 340 which are each inserted from the side of the floor pan assembly, parallel to surface 60 and to the vehicular frame 14, thereby obviating the need for an assembly pit. In this manner, the vehicular bed assembly 12 may be easily attached to the vehicle 10 by the use of a sidemount assembly which is cooperatively formed by the mounting assemblies 74, 76, 80, 82, 88 and 90.

It is to be understood that the invention is not limited to the exact construction or method which has been delineated above, but that various changes and modifications may be made without departing from the spirit and the scope of the invention as delineated in the following claims. It should also be realized that the vehicular bed 16, in another alternate and non-limiting embodiment of the invention, may only include the floor pan 16, thereby obviating the necessity for the walls 18, 20, 22, and 24, as well as the tailgate 25.

What is claimed is:

1. A vehicle bed assembly comprising:
   a floor pan;
   a pair of sidewalls, a frontwall, and a backwall coupled to said floor pan;

a mounting assembly that allows said floor pan to be selectively coupled to a frame of a vehicle;

a generally L shaped member coupled to said floor pan; and a gusset member coupled to said generally L shaped member and which abuttingly engages said frame of said vehicle when said floor pan is selectively coupled to said frame;

wherein said mounting assembly includes a flange member attached to said frame and a bracket disposed on a bottom side of said floor pan, said bracket configured to receive said flange member.

2. The vehicle bed assembly of claim 1 wherein said gusset member comprises a generally hollow member having a generally rectangular cross sectional area and including two substantially identical feet portions which are selectively coupled to said generally L shaped member.

3. The vehicle bed assembly of claim 2 wherein said frontwall extends above and below said floor pan and wherein the portion of said frontwall which extends below said floor pan forms a ledge which cooperates with said floor pan to form a bracket retention trench.

4. The vehicle bed assembly of claim 3 further comprising a generally hollow bracket disposed within said bracket retention trench and an assembly mounted upon said frame and which is selectively inserted within said generally hollow bracket.

5. The vehicle bed assembly of claim 1 wherein said frontwall includes raised stiffening ribs which extend above and below said floor pan.

6. The vehicle bed assembly of claim 4 wherein said floor pan has an exposed edge and wherein said vehicle bed assembly further comprises a generally U shaped bracket which is attached to and which is linearly coextensive to said exposed edge of said floor pan; a second bracket which is operatively contained within said U shaped bracket; a flange member which is disposed upon said vehicular frame and which is selectively inserted into said second bracket; and a fastener member which couples said flange member to said second bracket, thereby coupling said floor pan to said vehicular frame.

7. A vehicular bed assembly comprising:

a floor pan having longitudinally extending first raised stiffening ribs that cooperatively form at least three channels;

a frontwall coupled to said floor pan, the frontwall having second raised stiffening ribs that cooperatively form at least one second channel which is communicatively aligned with one of said at least three channels of said floor pan;

a first sidewall coupled to said floor pan, the first sidewall having third raised stiffening ribs that cooperatively form at least one third channel which is communicatively coupled to a second one of said at least three channels of said floor pan;

a second sidewall coupled to said floor pan, the second sidewall having fourth raised stiffening ribs that cooperatively form at least one fourth channel which is communicatively coupled to a third one of said at least three channels of said floor pan;

a backwall coupled to said floor pan, the backwall having fifth raised stiffening ribs that cooperatively form at least three channels which are respectively and communicatively aligned with at least one of said at least three channels of said floor pan, wherein said floor pan, backwall, frontwall, and said first and said second sidewalls cooperatively form a containment cavity; and an mounting assembly which is coupled to said floor pan and which allows said floor pan to be selectively coupled to a vehicular frame.

8. The vehicular bed assembly of claim 7 wherein said second raised stiffening ribs extend above and below said floor pan.

9. The vehicular bed assembly of claim 8 further comprising a tailgate upon which said backwall is disposed, said tailgate being selectively coupled to said floor pan.

10. The vehicle bed assembly of claim 7 wherein said vehicle bed assembly further comprises a generally L shaped member which is coupled to said floor pan; and a gusset member which is coupled to said generally L shaped member and which abuttingly engages said vehicular frame when said floor pan is selectively coupled to said vehicular frame.

11. The vehicle bed assembly of claim 10 wherein said gusset member comprises a generally hollow member having a generally rectangular cross sectional area and including two substantially identical feet portions which are selectively coupled to said generally L shaped member.

12. The vehicle bed assembly of claim 11 wherein said frontwall extends above and below said floor pan and wherein the portion of said frontwall which extends below said floor pan forms a ledge which cooperates with said floor pan to form a bracket retention trench.

13. The vehicle bed assembly of claim 12 further comprising a generally hollow bracket disposed within said bracket retention trench and a flange member mounted upon said vehicular frame and which is selectively inserted within said generally hollow bracket.

* * * * *